June 19, 1956 — W. WONSOWICZ — 2,750,830
LATHE THREAD CHASING HALF-NUT ASSEMBLY
Filed Dec. 9, 1953
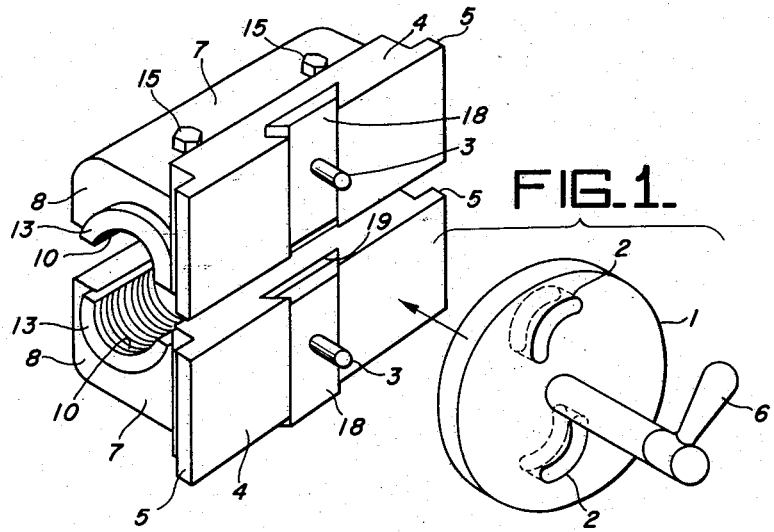
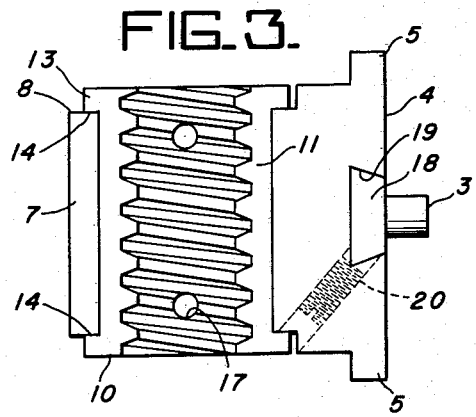
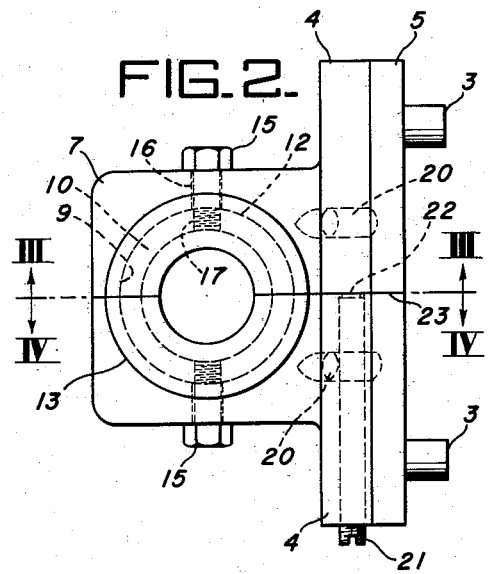
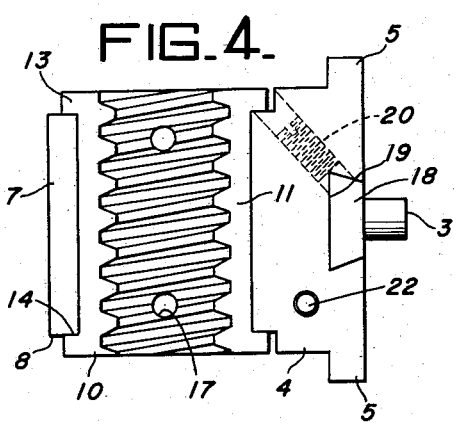
Inventor:
WALTER WONSOWICZ,
by: Donald G. Dalton
his Attorney.

| United States Patent Office | 2,750,830
Patented June 19, 1956 |

2,750,830

LATHE THREAD CHASING HALF-NUT ASSEMBLY

Walter Wonsowicz, Gary, Ind., assignor to United States Steel Corporation, a corporation of New Jersey Application December 9, 1953, Serial No. 397,210

3 Claims. (Cl. 82—23)

This invention relates, as indicated, to a lathe thread chasing half-nut assembly, and more particularly, is directed to an improved assembly having provision for the replacement of the half-nuts and accurate realignment thereof with respect to their supporting carriages and the operating mechanism for moving them to and from positions in driving engagement with the lead screw of the lathe.

Turning lathes are customarily provided with an apron of box type which is driven by a lead screw. The driving connection between the apron and lead screw is effected by a half-nut assembly comprised of upper and lower carriages respectively mounting half-nuts, the carriages being mounted for guided vertical movement on the apron toward and away from each other to simultaneously engage and disengage the half-nuts with respect to the lead screw. Engaging and disengaging movements of the carriages are effected through a manually rotatable disc having a pair of eccentric cam slots through which pins respectively secured to the upper and lower carriages project.

In use, the half-nuts are subject to wear and their replacement becomes necessary. Replacement of the half-nuts on the supporting carriages is conventionally accomplished by a recasting and rethreading operation. This involves removing from the carriages the metal in which the original half-nuts were threaded, recasting new metal on the supporting carriage, and thereafter rethreading the new metal. Half-nut assemblies which are rebuilt in this manner are not as accurate as the original equipment due to the limitations of the manufacturing facilities in the average machine shop. As a consequence, the rebuilt half-nuts will not mesh as accurately with the lead screw and will wear or break in a shorter period of time thus requiring more frequent replacement. In addition, rebuilding of half-nut assemblies by the conventional practice frequently disturbs the relative positions of the half-nut threads with respect to the operating mechanism which effects their movement to and from a position in meshing engagement with the lathe lead screw. If the metal in which the new half-nuts are threaded is cast a little thicker on one of the carriages than on the other, one of the half-nuts will engage the lead screw threads before the other. This will result in one of the half-nuts having too tight a fit on the lead screw which will result in excessive wear and the other having too loose a fit which will result in inaccurate machining operations.

This invention has as its principal object the provision of an improved half-nut assembly which will facilitate replacement of the half-nuts on their supporting carriage, which will provide a rebuilt assembly having the accuracy of original equipment, and in which provision is made for adjustment of the upper and lower carriages with respect to each other and the actuating mechanism therefor to insure the same fit of the two half-nuts on the lathe lead screw. In a manner to be described this is accomplished by fabricating the half-nuts in the form of semi-cylindrical shells and by providing a semi-cylindrical bracket on the supporting carriages in which the half-nut shells are receivable. The half-nut shells are detachably secured to the supporting brackets in order that they may be removed and replaced as needed. The half-nut shells and supporting brackets are provided with cooperating parts which insure their accurate alignment particularly in an axial direction with respect to each other. In this manner, half-nut assemblies constructed in accordance with the principles of this invention enable the manufacture and stocking of half-nuts as spare parts for use when needed.

A further object of the invention is to provide an adjustable mounting for the half-nuts by which their relative vertical positions may be adjusted with respect to the operating mechanism for effecting their engagement and disengagement with respect to the lead screw drive shaft. This is accomplished by providing for vertical adjustment of the operating pins through which vertical engaging and disengaging movements of the half-nuts are effected. By this arrangement, the fit of each half-nut on the lead screw can be precisely controlled and equalized.

Other objects and advantages of the invention will become apparent from the following description.

In the drawings there is shown a preferred embodiment of the invention. In this showing:

Figure 1 is an exploded perspective view of a half-nut assembly constructed in accordance with the principles of this invention and showing a manually rotatable operating disc by which relative vertical movements of the two half-nuts are effected;

Figure 2 is an end view of the half-nut assembly shown in Figure 1 with the half-nuts and their supporting carriages in the relative positions occupied by each other when the half-nuts are engaged with the lead screw of a lathe; and Figures 3 and 4 are similar plan views looking respectively in the directions of the lines III—III and IV—IV of Figure 2.

In Figure 1 of the drawings, the numeral 1 designates a manually rotatable disc having a pair of eccentric cam slots 2 for the reception of actuating pins 3 projecting outwardly from the carriages 4 of a half-nut assembly. Opposite ends of each carriage 4 have vertically extending tongues or guides 5 which are received in the guide slots (not shown) customarily provided on the apron box of a lathe carriage for guided vertical movement therein. The operating disc 1 is of course rotatably mounted on the apron box in conventioanl fashion with the pins 3 projecting through the cam slots 2 so that rotation of the operating lever 6 will be effective to actuate the carriages vertically relative to each other to effect engaging and disengaging movements of the half-nuts relative to the lead screw drive shaft. The parts thus far described are conventional and per se form no part of this invention.

In accordance with the principles of this invention each carriage 4 has an outwardly projecting bracket 7 rigidly secured thereto and having machined end surfaces 8 for a purpose to be described. The facing surfaces of the brackets 7 have semi-cylindrical grooves 9 formed therein which are machined to a close tolerance. The grooves 9 extend axially of the brackets 7 between the end surfaces 8. Half-nuts 10 are mounted in each of the bracket grooves 9.

Each of the half-nuts 10 comprises a semi-cylindrical shell body 11 having a smooth external surface 12 which is machined to a close fit for seating engagement in a bracket groove 9. Opposite ends of each shell have annular lips 13 projecting outwardly from the semi-cylindrical surface 12 and which have their inner surfaces 14 machined to a close tolerance. Each shell thus has a pair of facing annular surfaces 14 which are spaced axially from each other a distance corresponding to the length of the brackets 7 so that the surfaces 14 will have a close fit with the bracket end surfaces 8 when the shell is seated with the semi-cylindrical surfaces 9 and 12 engaged. In this manner, the abutting surfaces 8 and 14 align the position of the shell bodies 11 accurately in an axial direction relative to the brackets 7. The facing surfaces of the semi-cylindrical shells 11 are threaded in the manner of conventional half-nuts as best shown in Figs. 3 and 4 for meshing engagement with a lathe lead screw when the carriages 4 are moved to the relative positions shown in Figure 2.

Each half-nut shell 10 is secured to a supporting bracket by a pair of axially spaced headed fasteners 15. Each headed fastener extends through aligned openings 16 and 17 respectively in the brackets 7 and shell bodies 10, the openings 17 in the half-nut shells 10 being threaded for threaded engagement with threads on the end of the fastener 15 as best shown in Fig. 2.

It will be recalled that vertical engaging and disengaging movements of the carriages 4 are effected through the operating pins 3 which project through the eccentric cam slots 2 in the actuating discs 1. To provide for vertical adjustment of each half-nut relative to its operating mechanism, each pin 3 is secured to a vertically extending dovetail key 18 which is mounted in a dovetail keyway 19 extending vertically of the carriages 4. Set screws 20 are provided for locking each key 18 in position against vertical movement with respect to its carriage 4. By adjusting the positions of the keys 18 in the keyways 19, the positions of the carriages 4 relative to the actuating mechanism therefor can thus be precisely adjusted to insure proper fit of each half-nut shell with the lathe lead screw. In this manner each half-nut shell can be adjusted to have fitting engagement with the lathe lead screw of the same degree of tightness.

A set screw 21 extends vertically through one of the carriages 4 and has a surface 22 at its inner end for abutting engagement with the under surface 23 of the other carriage 4. By adjusting the set screw 21, the movement of the carriages 4 toward each other is limited to prevent both half-nut shells 10 from engaging too tightly with the lead screw.

From the foregoing, it will be apparent that the assembly of this invention provides half-nuts which may be removed and replaced with respect to their supporting carriages as needed. Attention is particularly directed to the fact that this permits the manufacture and stocking of the half-nuts 10 for use when needed. Attention is also directed to the fact that the cylindrical shape of the half-nuts together with the annular collars 13 and the manner in which the surfaces 8 and 14 have abutting engagement provide for accurate alignment of the half-nuts in the brackets 7. This together with the adjustment provided by the keyed mounting of the pins 3 is effective to insure a meshing engagement of the half-nut threads with the lathe lead screw having the same accuracy as original equipment. In addition, the assembly of this invention facilitates replacement and reduces the time required for this operation as compared to conventional practice.

While an embodiment of my invention has been shown and described it will be apparent that other adaptations and modifications may be made without departing from the scope of the following claims.

I claim:

1. In a half-nut assembly for driving engagement with the lead screw of a lathe, an upper carriage and a lower carriage respectively having a bracket support projecting outwardly therefrom, each of said brackets having a semi-cylindrical opening with the openings on the upper and lower carriages in facing relation, a pair of half-nuts respectively comprising a semi-cylindrical shell having a semi-cylindrical outer surface for seating engagement in one of said bracket grooves and its inner surface threaded, one of said shells being seated in each of said bracket supports, each of said shells having semi-annular collars at its ends projecting outwardly of its said semi-cylindrical outer surface and providing a pair of facing semi-annular surfaces having close fitting engagement with opposite end faces of the bracket on which it is supported to fix its axial position with respect to such bracket, at least a pair of threaded fastening elements extending through each bracket and securing the shell supported thereon against movement, each of said carriages having a vertically extending keyway with a key mounted therein for adjusting movement in the keyway, means engageable with each key for holding it against movement in its keyway, an actuating pin secured to and projecting outwardly from each key, and operating means engageable with said pins for actuating said carriages toward and away from each other.

2. In a half-nut assembly for driving engagement with the lead screw of a lathe, an upper carriage and a lower carriage respectively mounting a pair of half-nuts for threaded engagement with opposite sides of the lathe lead screw, each of said carriages having a vertically extending keyway with a key mounted therein for adjusting movement in the keyway, means engageable with each key for holding it against movement in its keyway, an actuating pin secured to and projecting outwardly from each key, and operating means engageable with said pins for actuating said carriages toward and away from each other.

3. In a half-nut assembly for driving engagement with the lead screw of a lathe, an upper carriage and a lower carriage, a pair of half-nuts, means detachably mounting said half-nuts respectively on said upper and lower carriages, a pair of vertically spaced operating pins respectively projecting laterally from said upper and lower carriages for operating said carriages vertically to move the half-nuts mounted thereon into and out of driving engagement with a lathe lead screw, and means for adjusting the driving fit of said half-nuts with the lathe lead screw engaged thereby comprising a pair of keys to which said pins are respectively secured, each of said carriages having a keyway mounting one of said keys, and set-screws for locking each key against movement in its keyway.

References Cited in the file of this patent

UNITED STATES PATENTS

| | | |
|---|---|---|
| 667,277 | Williams | Feb. 5, 1901 |
| 2,438,236 | Strom | Mar. 23, 1948 |
| 2,581,082 | Drissner | Jan. 1, 1952 |